(12) United States Patent
Conradt et al.

(10) Patent No.: US 12,441,424 B2
(45) Date of Patent: Oct. 14, 2025

(54) BICYCLE FORK AND BICYCLE FORK SYSTEM

(71) Applicant: Canyon Bicycles GmbH, Koblenz (DE)

(72) Inventors: Mario Conradt, Koblenz (DE); Noah Hoertig, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 643 days.

(21) Appl. No.: 17/876,702

(22) Filed: Jul. 29, 2022

(65) Prior Publication Data

US 2023/0035326 A1 Feb. 2, 2023

(30) Foreign Application Priority Data

Jul. 30, 2021 (DE) ............ 20 2021 104 078.5

(51) Int. Cl.
 *B62J 11/13* (2020.01)
 *B62K 19/32* (2006.01)
 *B62K 21/02* (2006.01)

(52) U.S. Cl.
 CPC ........... *B62J 11/13* (2020.02); *B62K 19/32* (2013.01); *B62K 21/02* (2013.01)

(58) Field of Classification Search
 CPC .......... B62J 11/10; B62J 11/13; B62K 19/32; B62K 21/02
 See application file for complete search history.

(56) References Cited

U.S. PATENT DOCUMENTS

| | | | | |
|---|---|---|---|---|
| 5,297,811 | A * | 3/1994 | Chi | B62K 21/06 411/432 |
| 5,320,374 | A * | 6/1994 | Farris | F16F 9/3235 280/283 |
| 5,433,465 | A * | 7/1995 | Klein | B62K 19/30 280/281.1 |
| 5,494,302 | A * | 2/1996 | Farris | B62K 25/08 280/283 |
| 5,924,714 | A | 7/1999 | Farris et al. | |
| 6,145,862 | A * | 11/2000 | D'Aluisio | B62K 21/20 280/283 |
| 7,093,844 | B2 * | 8/2006 | Horiuchi | B62K 19/32 280/279 |
| 7,341,269 | B2 * | 3/2008 | Horiuchi | B62K 19/32 280/279 |
| 7,891,687 | B2 * | 2/2011 | Schmider | B62K 19/30 280/281.1 |
| 10,150,530 | B2 * | 12/2018 | Lund | B62K 21/18 |
| 10,710,670 | B2 * | 7/2020 | Lund | B62J 1/08 |

(Continued)

FOREIGN PATENT DOCUMENTS

DE 202016101573 U1 8/2017
EP 3812257 A1 4/2021
(Continued)

*Primary Examiner* — Minnah L Seoh
*Assistant Examiner* — Michael R Stabley
(74) *Attorney, Agent, or Firm* — The Webb Law Firm

(57) ABSTRACT

A bicycle fork including two fork legs connected with each other via a fork bridge. The fork bridge is connected with a steer tube. For a simpler arrangement of shift cables, hydraulic lines, cables and the like, the steer tube includes at least one flattening extending in the longitudinal direction of the steer shaft.

17 Claims, 5 Drawing Sheets

(56) References Cited

U.S. PATENT DOCUMENTS

| | | | |
|---|---|---|---|
| 2006/0145446 A1 | 7/2006 | Schmider | |
| 2016/0339985 A1 | 11/2016 | Lund et al. | |
| 2018/0118300 A1 | 5/2018 | Lin | |
| 2019/0077484 A1* | 3/2019 | Lund | B60T 7/08 |
| 2021/0122439 A1 | 4/2021 | Rinard et al. | |

FOREIGN PATENT DOCUMENTS

| | | |
|---|---|---|
| GB | 2494714 A | 3/2013 |
| NL | 2016166 B1 | 8/2017 |
| WO | 2015180756 A1 | 12/2015 |

\* cited by examiner

BICYCLE FORK AND BICYCLE FORK SYSTEM

CROSS-REFERENCE TO RELATED APPLICATION

This application claims priority to German Patent Application No. 20 2021 104 078.5 filed Jul. 30, 2021, the disclosure of which is hereby incorporated by reference in its entirety.

BACKGROUND OF THE DISCLOSURE

The disclosure relates to a bicycle fork as well as to a bicycle fork system.

DESCRIPTION OF RELATED ART

In modern bicycles, Bowden cables, shift cables and the like are arranged inside the frame. For example, brake cables, shift cables and the like extend, possibly directly, from the handlebar into the handlebar stem and are then passed through the head tube of the frame into the top tube or the down tube of the frame. Further, for example, a hydraulic line for a front wheel brake may be passed into the steer tube and from there into the fork leg via the fork bridge. Moreover, it is known for example, to insert shift cables, lines, wires and the like directly from a switch lever, a brake lever or the like into the handlebar and to lead them further into the handlebar stem inside the handlebar. In particular with racing bicycles, but also with other bicycles having a rather slim design, there is a problem that the outer dimensions of the head tube of the bicycle frame are relatively small and therefore only little space is avail-able in the head tube to arrange shift cables, hydraulic lines, wires and the like in addition to the steer tube and the two bearings.

SUMMARY OF THE DISCLOSURE

It is an object of the disclosure to provide a bicycle fork, as well as a bicycle fork system which allows to arrange shift cables, wires, hydraulic lines and the like inside the head tube even in the case of little installation space.

According to the disclosure, the object is achieved with a bicycle fork with the features as described herein.

The bicycle fork according to the disclosure comprises two fork legs connected with each other via a fork bridge. Connected to the fork bridge is a steer tube which, when mounted, is arranged inside the head tube of the bicycle frame. According to the disclosure, the steer tube comprises at least one flattening extending in the longitudinal direction. As used throughout the present disclosure, the terms "flattening" and "flattenings" may refer to a flattened portion or multiple flattened portions, as appropriate in context. Preferably, the steer tube thus has a non-circular cross section in a portion thereof. Starting for example from a circular cross section, a flattening may be a chord with respect to a circle. With a steer tube having a circular inner diameter and being arranged inside a head tube, the cavity or a channel existing between the flattening of the steer tube and the inner side of the head tube is thus enlarged. Shift cables, wires, hydraulic lines and the like can be arranged in this enlarged cavity.

It is particularly preferred that the steer tube has a plurality of flattenings, in particular two flattenings, which extend in the longitudinal direction, wherein the at least one flattening does not necessarily have to extend across the entire length of the steer tube. It is relevant that the flattening is provided in that region in which hydraulic lines and the like are to be arranged.

In a particularly preferred embodiment of the bicycle fork, a front side of the steer tube is convexly curved. In particular, the front side of the steer tube is formed corresponding to a circular arc. Thus, the steer tube preferably comprises a front part directed in the traveling direction, which is formed in a ring segment-shape. This corresponding ring segment-shaped front part of the steer tube extends preferably in the circumferential direction over an angle of at least 90°. Preferably, the ring segment-shaped part extends over an angle of at least 120°, in particular at least 150°. In order to be able to realize at least one, in particular two sufficiently large flattening at the steer tube and to thus realize sufficient space for arranging shift cables and the like, it is further preferred that the ring segment-shaped front part of the steer tube extends over an angle of less than 270°, in particular less than 230° and, as is particularly preferred, less than 200°. In a particularly preferred embodiment, the ring segment-shaped part of the steer tube extends over 180°±10°, in particular ±5°.

In a particularly preferred embodiment, a rear side of the steer tube, directed opposite to the traveling direction when mounted, is also convexly curved. It is particularly preferred that the rear side of the steer tube is arranged opposite the front side and both sides are formed in a circular arc-shape and, in particular, have the same circular center. Both the front side and the rear side are thus arranged on the same circular ring. In a preferred embodiment, the circular center is located on the longitudinal axis of the steer tube.

It is particularly preferred that a rear part of the steer tube, forming in particular the rear side, is formed in a ring segment-shape. If, in a preferred embodiment, also the front part of the steer tube is formed in a ring-segment shape, it is preferred that the angle range of the rear part is smaller than the range of the front part. Regardless thereof, it is preferred that the rear part has an angle range of at least 20°, in particular at least 30° and, as is particularly preferred, at least 40°. Further, for realizing at least a sufficiently large flattening and thus a large installation space for cables and the like, it is preferred that the rear ring segment-shaped part extends over less than 120°, in particular less than 90° and, as is particularly preferred, less than 70°.

The steer tube preferably includes two flattenings. In a particularly preferred embodiment of the disclosure, these are located between the front part and the rear part of the steer tube. In particular, the steer tube is formed to be mirror symmetric with respect to a center plane extending through the longitudinal axis of the steer tube.

The in particular two flattenings extend from an upper end of the steer tube towards the fork bridge. Thereby, it is possible, in particular, to use the bicycle fork of the disclosure for various bicycle frame sizes, since the steer shaft can thereby be short-ened to fit. Thereby, it is also possible to individually adjust the handlebar height by providing different spacers. In a preferred embodiment, the in particular two flattenings extend from the upper end of the steer tube across at least 50%, in particular at least 75% of the total length of the steer tube. In the mounted state, the in particular two flattenings extend at least to a midportion of the head tube, in particular at least to a lower quarter of the head tube.

In a preferred development of the bicycle fork according to the disclosure, the steer tube has a part facing the fork bridge, which part is formed in a circular cylindrical shape. This circular cylindrical shaped extends preferably from the fork bridge in the longitudinal direction for at least 20 mm, in particular for at least 45 mm. In particular, the cylindrical part is shorter than 70 mm, in particular shorter than 50 mm.

A transition region or a transition part may be provided between the cylindrical part of the steer tube and the part of the steer tube having the at least one flattening, wherein a direct, possibly step-shaped transition is possible. It is preferred to realize a transition that is as smooth as possible, in particular stepless.

It is particularly preferred that a longitudinal axis of that part of the steer tube in which the flattenings are provided, is offset with respect to a longitudinal axis of the cylindrical part of the steer tube. The two longitudinal axes are thus not coaxial, but extend preferably in parallel with each other. Preferably, the offset between the to longitudinal axes is 2 mm-5 mm, in particular 2 mm-3 mm. Here, it is further preferred that the longitudinal axis of that part of the steer tube in which the at least one flattening is provided, is arranged in front of the longitudinal axis of the cylindrical axis, seen in the traveling direction. Further, it is preferred that the outer circumference of the cylindrical part of the cable shaft is greater than that of the part of the steer tube having the flattening.

The bicycle fork system according to the disclosure comprises a bicycle fork as described above, wherein the bicycle fork may preferably be developed in an advantageous manner, as described above. Further, the bicycle fork system according to the disclosure includes a cover cap adapted to be connected with an upper region of the steer tube. In the mounted state, the cover cap is provided preferably immediately above the head tube of the bicycle frame. In the mounted state, the upper end of the steer tube typically protrudes upward beyond the cover flap. In this region, the steer tube is connected with the handlebar stem, wherein, possibly, spacers may be arranged between the cover cap and the handlebar stem.

In a preferred embodiment, the cover cap has a central opening which in particular is a lead-through opening. This opening in which the steer tube is arranged, has an inner contour that corresponds to the outer contour of the steer tube in the region of the in particular two flattenings. Thereby, it is possible on the one hand to seal the region between the outer side of the steer tube and the opening of the cover flap in a simple manner and, on the other hand, the position of the cover flap on the steer tube is clearly defined. In particular, it is not possible to twist the cover cap on the steer tube.

Preferably, the opening comprises at least one, in particular two indentations. The indentations correspond to the flattenings of the steer tube. Preferably, a lead-through opening is provided in the region of the at least one indentation. The same serves for passing the cables, hydraulic lines or the like therethrough. If, in a preferred development, the steer tube has a plurality, in particular two flattenings, it is preferred that also the cover cap comprises a corresponding number of lead-through openings.

Preferably, a sealing element is arranged in the at least one lead-through opening, through which element the lines or the like are passed. By providing one sealing element per lead-through opening, an ingress of humidity is prevented.

It is further preferred that the cover cap has a circumferential, in particular annular seal at a lower side. Thereby, a reliable sealing from an upper side of the head tube of the bicycle frame is ensured.

In a particularly preferred embodiment, the cover cap comprises a holding element. The same serves for fixing the cover cap to the steer tube. Preferably, the holding element has a clamping element which, by means of a fixing element such as a screw, clampingly presses against an outer side of the steer tube, when mounted. The possibility of fixing the cover cap to the steer tube has an essential advantage with respect to assembly. It is thus possible, to arrange the steer tube of the bicycle fork in the head tube together with the bearings of the head tube prior to fixing the cover cap. In the next step, the bearings are usually pretensioned. Thereafter, the cover cap is fixed. This has the essential advantage that the handlebar stem connected to a handlebar can be removed from the upper end of the steer tube without the pretensioning of the bearings changing. For example, this has the substantial advantage that for transporting the bicycle, the handlebar with the handlebar stem can be disassembled from the steer tube and no adjustment of the bearings has to be performed for a later assembly.

The bicycle fork according to the disclosure, as well as the bicycle fork system according to the disclosure have, in particular, the advantage that they can be used for different frame model series. Thus, this is a platform solution, since the size can be adjusted in particular due to the possibility of shortening the steer tube. By providing flattenings at the head tube, as provided by the disclosure, it is further possible to place lines etc. inside the head tube and, at the same time, to realize a head tube with small outer dimensions. In particular, the design according to the disclosure allows to realize steering bearing with relatively small inner diameters. As such, it is possible to use an upper steering bearing among the steering bearings which has an inner diameter of less than 40 mm, possibly even with an inner diameter of 35 mm±2 mm.

Due to the preferred provision of seals at the lower side of the cover cap on the one hand and in the lead-through opening of the cover cap on the other hand, a good tightness is realized. Thereby, the service life of the steering bearings can be ex-tended significantly.

BRIEF DESCRIPTION OF THE DRAWINGS

In the following, the disclosure is described in more detail by means of a preferred embodiment with reference to the accompanying drawings.

In the drawings.

DETAILED DESCRIPTION

Figure 1:
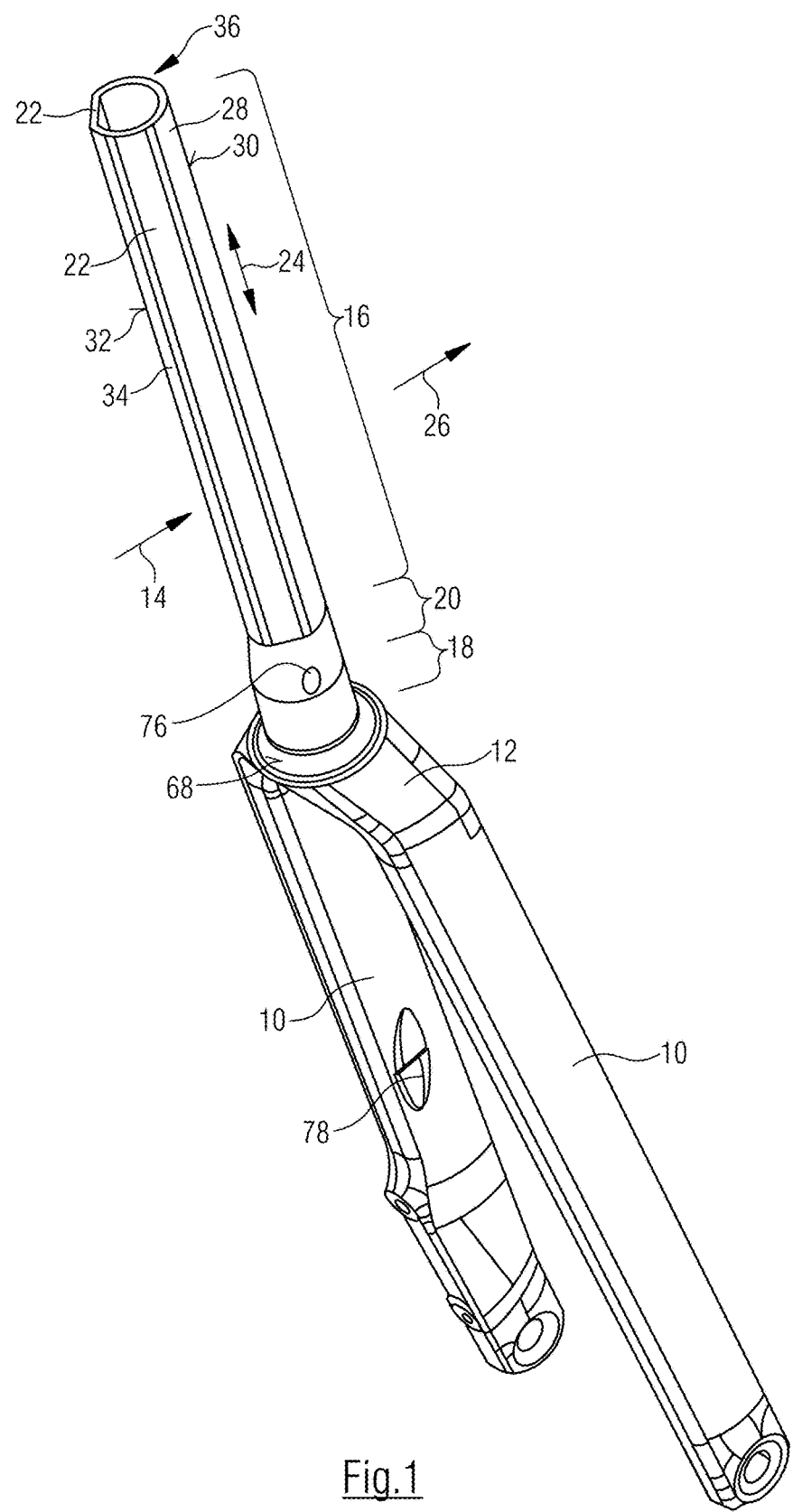
FIG. 1 is a schematic perspective view of a bicycle fork.

A bicycle fork comprises two fork legs 10 connected with each other via a fork bridge 12. The fork bridge 12 is connected with a steer tube 14. According to the disclosure, the steer tube 14 has an upper part 16, a lower part 18, as well as a connecting part 20.

In the embodiment illustrated, the upper part 16 has a circular basic shape in cross section, wherein the shape has a non-circular cross section due to two flattenings. The two flattenings 22 that extend in the longitudinal direction 24 of the steer tube 14, have a substantially flat upper side and are formed in the manner of a chord in a circular cross section. Seen in the traveling direction 26, the upper part 16 of the steer tube 14 has a front part 28, the front side 30 of which is convexly curved, the front side being a circular arc-shaped front side in the illustrated embodiment. As can be seen in particular in FIG. 2, the front part 28 is formed in a circular ring segment shape. Starting clockwise from the left flattening 22 in FIG. 1 to the right flattening 22, the front part 28 extends over an angle of about 180°±10°.

Opposite the front side 30, the steer tube has a rear side 32 which is also convexly curved and formed in a circular arc shape in the embodiment illustrated. The front side 30, as well as the rear side 32 have the same center or are located on the same circle line. A rear part 34 forming the rear side 32 is located opposite the front part 28. The rear part 34 is also formed in a circular ring segment shape and has the same center as the front circular ring-shaped segment 28. In the embodiment illustrated, the rear part 34 extends counterclockwise from the left flattening in FIG. 2 to the right flattening in FIG. 2 over about 30°±10°.

Between the two ring segment-shaped parts 28 and 34, the two flattenings 22 are arranged which in the embodiment illustrated are formed as planar straight walls, so that in the upper part, the steer tube 14 has a closed contour in the circumferential direction.

The two flattenings 22 shown in the embodiment illustrated extend from an upper end 36 of the steer tube 14 over at least ⅔ of the length of the steer tube 14 toward the fork bridge 12. The lower part 18 is formed at the fork bridge-side end of the steer tube 14. The same has a cylindrical cross section. Here, the outer diameter of the lower part 18 is larger than the outer diameter of the upper part 16 of the steer tube 14. The intermediate part 20 serves for connecting the upper part 16 and the lower part 18 and aligns the different outer contours of the two parts 16, 18.

The upper part 16 of the steer tube 14 having the flattenings is not coaxial with the cylindrical part 18, but is arranged offset in the traveling direction 26. As is evident in particular from FIG. 2, a longitudinal axis 38 of the upper part 16 of the steer tube is offset forward in the traveling direction 26 with respect to a longitudinal axis 40 of the lower cylindrical part 18 of the steer tube. On the longitudinal axes 38, 40, also the centers of the ring segment-shaped elements 28, 34 or the cylindrical lower part 18, respectively.

Figure 2:
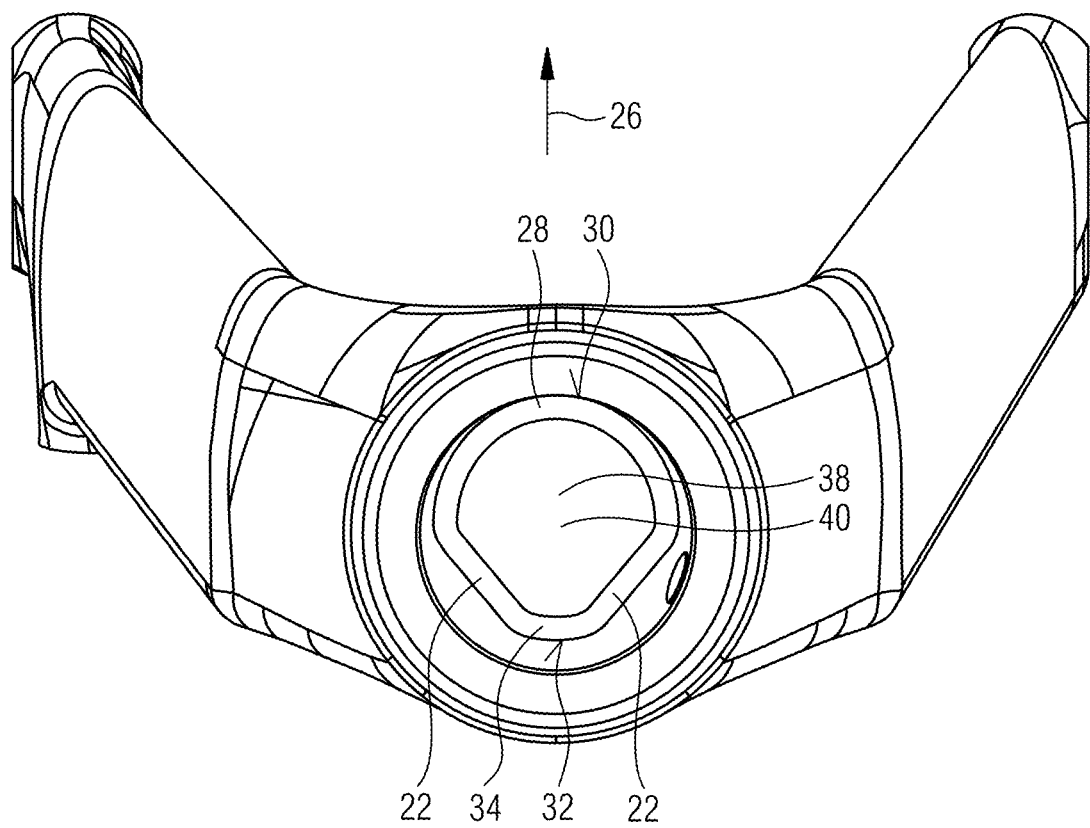
FIG. 2 is a schematic top plan view of the bicycle fork illustrated in FIG. 1.

As is evident in particular from FIG. 2, the design of the upper part 16 of the steer tube creates a cavity in the region of the flattenings 22, in which shift cables, hydraulic lines, wires and the like can be arranged.

Figure 3:
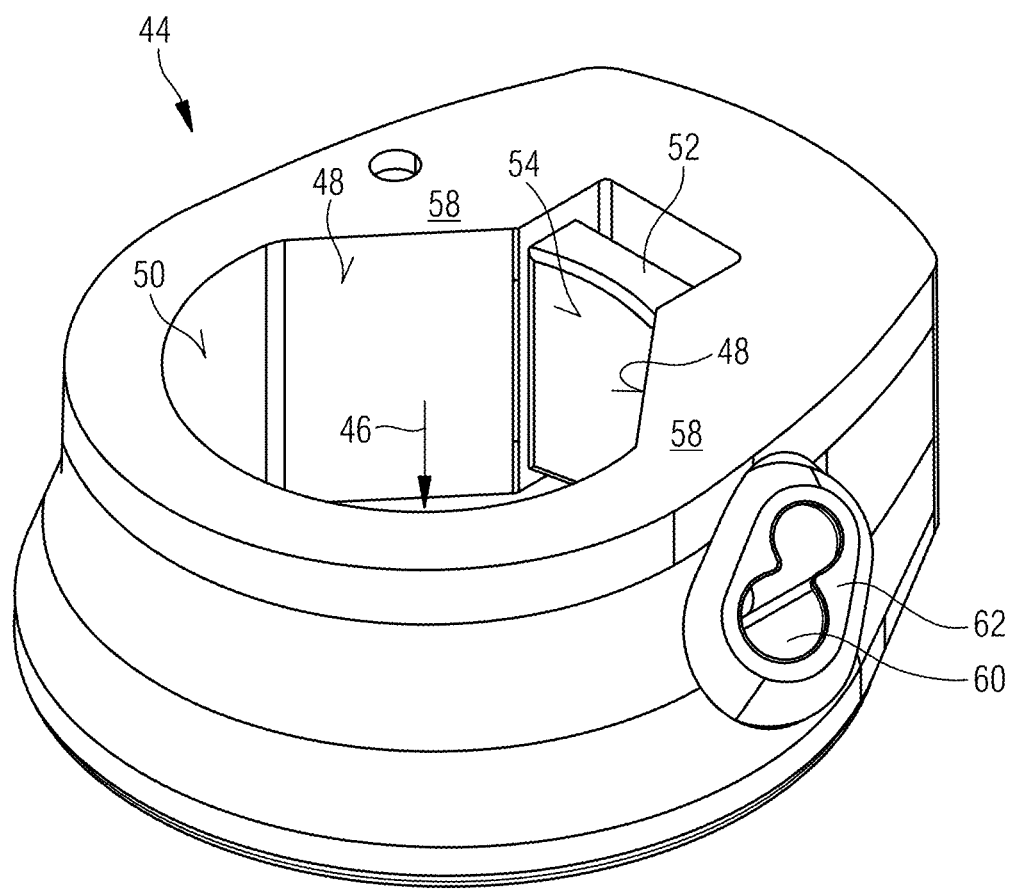
FIG. 3 is a schematic perspective top plan view of a cover cap.
Figure 4:
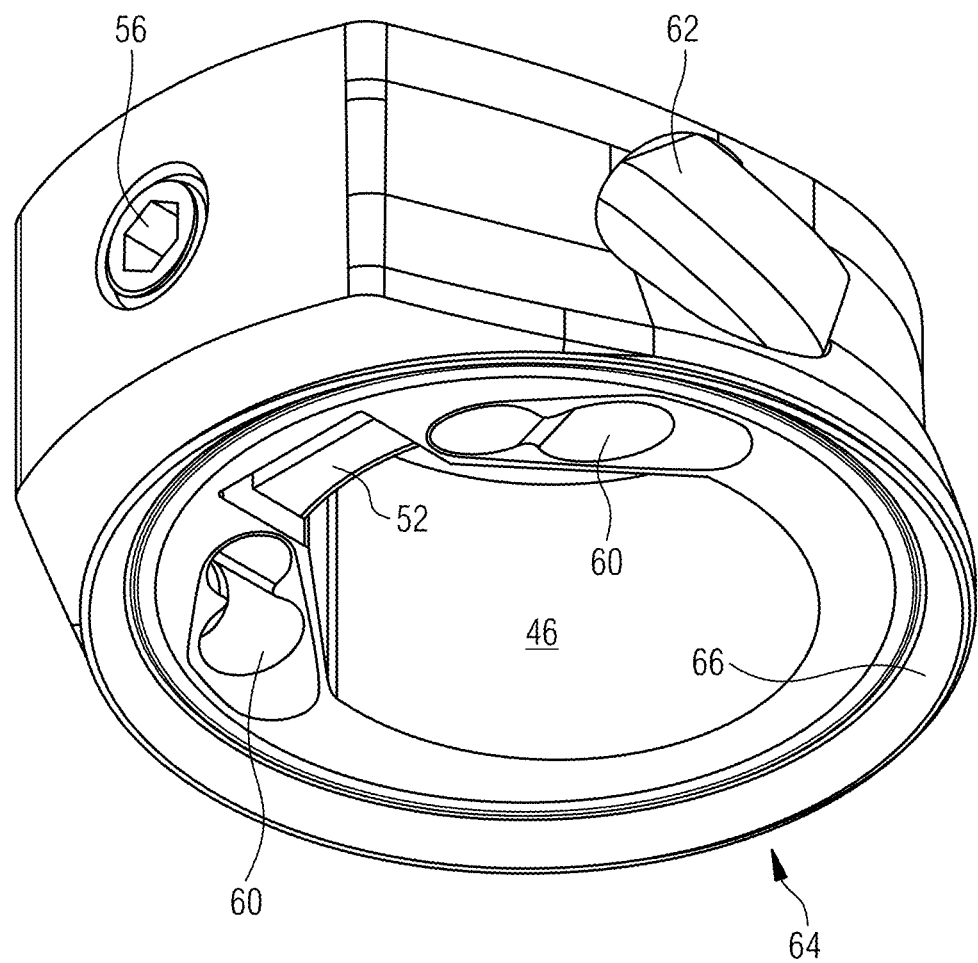
FIG. 4 is a schematic perspective view of the cover cap shown in FIG. 3, seen from below
Figure 5:
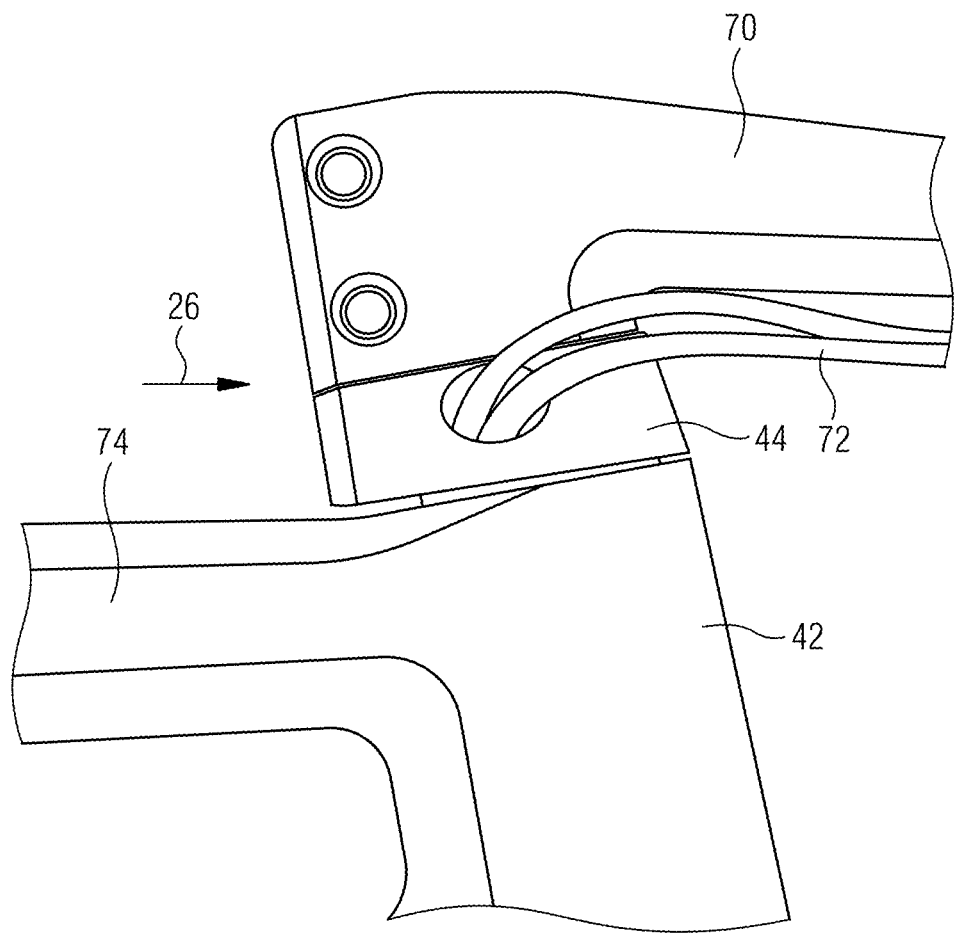
FIG. 5 is a schematic side view of a head tube of a bicycle frame together with a handlebar stem in the mounted state.

Depending on the size of the bicycle frame and thus depending on the length of a head tube 42 (FIG. 5) of the bicycle frame in which the steer tube 14 is arranged, an upper end of the steer tube 14 protrudes. In the mounted state, a cover cap 44 is arranged above the head tube 42 of the bicycle frame. The cover cap 44 is illustrated in detail in FIGS. 3 and 4. The cover cap 44 has an opening 46 formed as a lead-through opening. In the mounted state, the upper part 16 of the steer tube 14 is arranged in the opening 46. An inner contour of the opening 46 corresponds to the outer contour of the upper part 16 of the steer tube 14. As such, the opening 46 has two opposite flat sides 48. In the mounted state, the flat sides 48 are parallel to the flattenings 22. Further, the opening 46 comprises a circular segment-shaped section 50 which in the mounted state, extends parallel to the front side 30. A clamping element 52 is arranged opposite the inner side 50 of the opening 46, the inner side 54 thereof being concavely curved. In the mounted state, the inner side 54 of the clamping element 52 is pressed against the rear side 32. For this purpose, the clamping element 52 is connected with a screw 56 to form a holding element. The screw 56 engaging the thread serves for displacing the clamping element 54 for a clamping fixing on the rear side 32 of the steer tube.

For forming the flat side walls 48, with respect to a usually round opening, the cover cap 44 has indentations 58. Lead-through openings 60 are provided in particular in the region of these two indentations 58. In the embodiment illustrated, each lead-through opening 60 serves for leading through two wires, cables, hydraulic lines or the like. A respective sealing element 62 is arranged in each of the lead-through openings 60 in order to avoid the ingress of water or humidity.

Further, an annular sealing element 66 is arranged on a lower side 64. In the mounted state (FIG. 5), the sealing element 66 abuts on an upper side of the head tube 42, so that the ingress of humidity into the head tube 42 is avoided in this region, too.

For mounting, the steer tube 14 is inserted into the head tube 42 of the bicycle frame (FIG. 5) from below. Here, a lower bearing is arranged in the steer tube 14, which bearing rests on an annular surface 68 (FIG. 1) in the mounted state. As is typical, a bearing is arranged also in the upper region of the head tube 42. A com-pression ring is arranged above the bearing. The same is designed such that it is enlarged on a side that is a rear side with respect to the traveling direction 26. Thereby, the offset between the upper part 16 of the steer tube 14 and the lower part 18 of the steer tube 14 is compensated for, since the two bearings have to be arranged coaxially one relative to the other.

In the next step, the bearings are pretensioned, for example via a conventional tensioning means arranged inside the steer tube and supported on the upper side of the steer tube. As soon as the bearings are pretensioned, the cover cap 44 can be fixed using the holding element 52, 56 by clampingly connecting the same with the upper part 16 of the steer tube 14. Since the pretensioning of the bearings is thereby main-tained, a handlebar stem 70 (FIG. 5) can, for example, be disassembled for transport together with the handlebar stem, without a new adjustment of the bearings having to be performed.

During assembly, wires, shift cables, hydraulic lines and the like can be mounted in a simple manner. For this purpose, the cables 72 are passed through the lead-through openings 60 in the cover cap 44 and then extend along the flattenings 22 downward in the direction of the fork bridge 12. Depending on the cables etc., these may then be lead into a top tube 74 of the bicycle frame or also into a downtube of the bicycle frame, not illustrated to be led to the gear system, the rear wheel brake or the like. For connection with a front wheel brake, a hydraulic line or another cable can be led along the flattening 22, which is the right flattening with respect to the traveling direction 26 in FIG. 2, and then be led into the inside of the steer tube 14 through an opening 76 provided in the transition part 20. From there, for example, the hydraulic line can be led further through the fork bridge 12 into a fork leg 10 and to a hydraulic brake. Then, the hydraulic line is led out and to the hydraulic brake through an opening 78 in the left fork leg 10.

What is claimed is:
1. A bicycle fork comprising:
two fork legs connected with one another via a fork bridge, and
a steer tube connected with the fork bridge,
the steer tube comprising two flattened portions extending in the longitudinal direction of the steer tube and a cylindrical lower part facing the fork bridge, wherein the lower cylindrical part is arranged to be offset and not coaxial with respect to an upper part of the steer tube having the two flattened portions.

2. The bicycle fork according to claim 1, wherein the two flattened portions are arranged between a front part and a rear part and the two flattened portions extend from an upper end of the steer tube towards the fork bridge, wherein the two flattened portions extend over at least 50% of a total length of the steer tube.

3. The bicycle fork according to claim 1, wherein a front side of the steer tube directed in a traveling direction is convexly curved and formed in a circular arc shape.

4. The bicycle fork according to claim 1, wherein a front part of the steer tube directed in a traveling direction is formed in a ring segment shape, wherein the ring segment-shaped part extends over at least 90°.

5. The bicycle fork according to claim 4, wherein the ring segment-shaped part extends over an angle of less than 270°.

6. The bicycle fork according to claim 1, wherein a rear side of the steer tube directed opposite to a traveling direction is convexly curved and formed in a circular arc shape, wherein the rear side is arranged opposite a front side and both the front side and the rear side have the same circular center.

7. The bicycle fork according to claim 1, wherein a rear part of the steer tube directed opposite to a traveling direction is formed in a ring segment shape, wherein the rear part extends over at least 20°.

8. The bicycle fork according to claim 7, wherein the ring-segment shaped rear part extends over an angle of less than 120°.

9. The bicycle fork according to claim 1, wherein the cylindrical lower part extends from the fork bridge over at least 20 mm.

10. The bicycle fork according to claim 9, wherein the cylindrical lower part has a larger outer diameter than the upper part of the steer tube.

11. The bicycle fork according to claim 1, further comprising a bearing seat for a lower steering bearing on an upper side of the fork bridge.

12. A bicycle fork system comprising:
a bicycle fork according to claim 1, and
a cover cap connected with an upper region of the steer tube.

13. The bicycle fork system according to claim 12, the cover cap comprising a central opening, the contour of which corresponds to the outer contour of the steer tube in the region of the two flattened portions, wherein the opening has a respective indentation in the region of the two flattened portions.

14. The bicycle fork system according to claim 13, the cover cap further comprising at least one lead-through opening for at least one of wires, cables, hydraulic lines, or a combination thereof, wherein the lead-through opening is arranged in a region of the indentation.

15. The bicycle fork system according to claim 14, the at least one lead-through opening further comprising a sealing element.

16. The bicycle fork system according to claim 12, further comprising a circumferential and annular seal on a lower side of the cover cap.

17. The bicycle fork system according to claim 12, the cover cap further comprising a holding element for fixing the cover cap to the steer tube, wherein, in the mounted state, the holding element comprises a clamping element clampingly pressing against an outer side of the steer tube using a fixing element.

\* \* \* \* \*